(12) United States Patent
Steneby

(10) Patent No.: US 7,813,061 B2
(45) Date of Patent: Oct. 12, 2010

(54) LIGHT COLLECTING DEVICE

(75) Inventor: Bengt Steneby, Partille (SE)

(73) Assignee: Parans Solar Lighting AB, Goteborg (SE)

( * ) Notice: Subject to any disclaimer, the term of this patent is extended or adjusted under 35 U.S.C. 154(b) by 164 days.

(21) Appl. No.: 11/577,970

(22) PCT Filed: Nov. 1, 2005

(86) PCT No.: PCT/SE2005/001636

§ 371 (c)(1),
(2), (4) Date: Apr. 8, 2009

(87) PCT Pub. No.: WO2006/049560

PCT Pub. Date: May 11, 2006

(65) Prior Publication Data

US 2009/0195895 A1     Aug. 6, 2009

Related U.S. Application Data

(60) Provisional application No. 60/624,123, filed on Nov. 1, 2004.

(51) Int. Cl.
G02B 7/02     (2006.01)
H02N 6/00     (2006.01)
H01L 31/042   (2006.01)

(52) U.S. Cl. .................................. 359/811; 136/246
(58) Field of Classification Search ............... 359/811, 359/812, 619, 626, 896, 592, 593; 136/246, 136/244
See application file for complete search history.

(56) References Cited

U.S. PATENT DOCUMENTS 5,581,447 A     12/1996     Raasakka et al.

FOREIGN PATENT DOCUMENTS

CZ          284185 B6     6/1996

OTHER PUBLICATIONS

International Bureau, "International Preliminary Report on Patentability" May 1, 2007.

*Primary Examiner*—Alicia M Harrington
(74) *Attorney, Agent, or Firm*—Holland & Hart LLP

(57) ABSTRACT

The present invention relates to collecting sunlight and to transport said sunlight into a space. The sunlight collecting device comprises at least a first focusing lens and at least a first light collector. A first and a second movable sheet are provided with a first vertical distance from each other. A pendulum is provided to hold the focusing lens and to also be coupled to a first sheet by a first joint and to a second sheet by a second joint. Said first and second joint provides movement in at least two orthogonal directions.

15 Claims, 7 Drawing Sheets

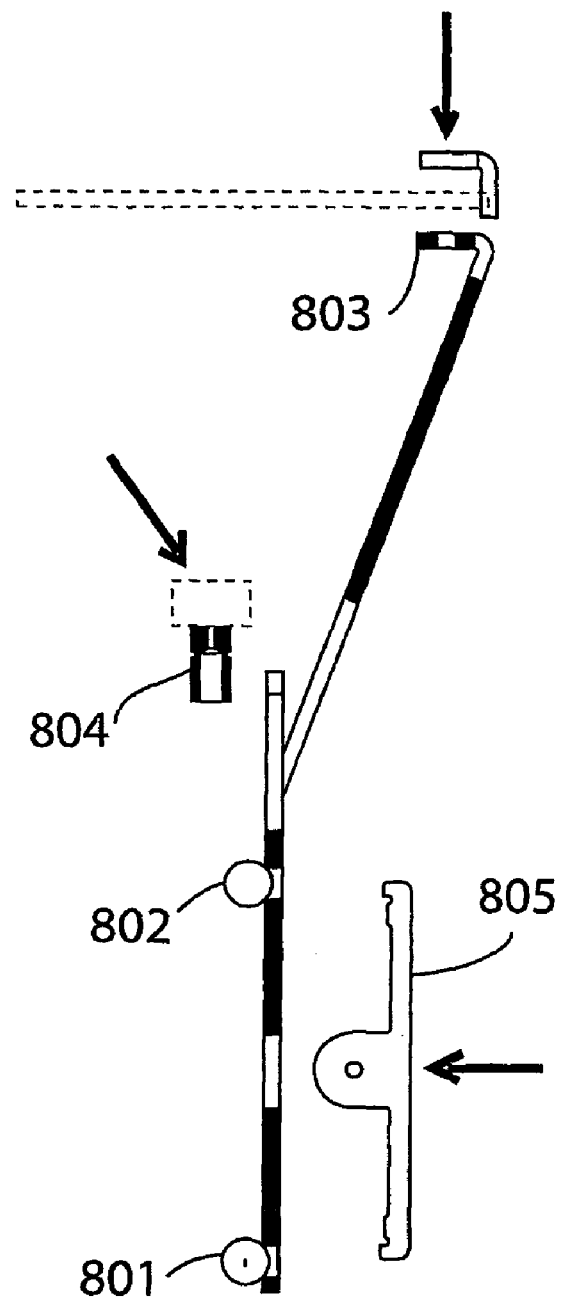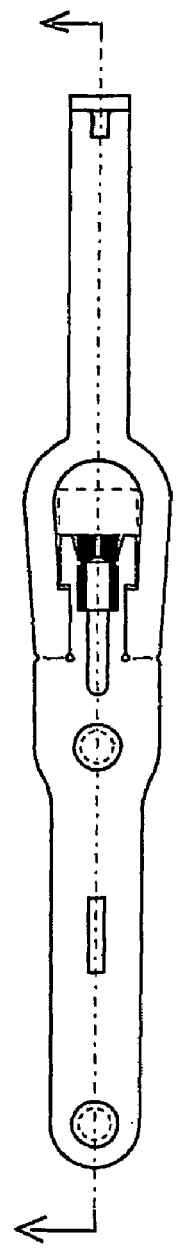
Fig 8a
Fig 8b

LIGHT COLLECTING DEVICE

TECHNICAL FIELD

The present invention relates to collecting sunlight. More specifically, the present invention relates to an automatic sun tracking device and lens arrangement for collection of sunlight.

BACKGROUND OF THE INVENTION

To be able to introduce daylight into a building has in all times been of great interest. The human being has during the years, apart from the modern era with electrical light, been dependent on the daylight and has biologically evolved under this constraint. The changing intensity and colour of the daylight has a significant effect on peoples perception of passed time, when to have different types of meals, when to sleep and when to get up, just to mention a few.

When designing buildings the introduction of daylight is a major design consideration. Different kind of windows and skylights are the most common technology used. They are limited when it comes to transporting daylight into buildings; only areas close to the windows or skylights are illuminated. They are also taking up a lot of space on the building's exterior; this is especially a problem on the roofs where space is needed also for other things such as ventilation fans and antennas.

A few sun collectors for illumination purposes are available today; they are all bulky and difficult to integrate in the architecture. Many of them also have moveable parts exposed to weather and wind which increases the risk for malfunction.

SUMMARY OF THE INVENTION

It is an object of one aspect according to the present invention to provide such apparatus and method that collects solar light in an efficient manner for transmission into a space such as a building, a ship, a road tunnel, a cave, a mine, a spacecraft or the like.

One object according to an aspect of the invention is to provide said apparatus in embodiments that when mounted in plurality on a building or other structure will function as roof or façade. The surface of numerous of said apparatus will be a shield against weather and wind and isolate against cold and heat.

One object according to an aspect of the invention is to provide said apparatus in embodiments that can be mounted in combination with windows or skylights in such ways that the apparatus will work as sunshields or shutters. They can in different positions either block, partly block or let light through a window or a skylight.

One object according to an aspect of the invention is to provide an apparatus that can collect the solar radiation hitting a certain flat area, during the day, in an efficient manner.

One object according to an aspect of the invention is to provide an apparatus with an exterior that is shaped as a block with at least one transparent surface. The block can be formed as a square plate or any other geometrical shape that will let similar blocks, placed in plurality next to each other, form a covering surface. Said blocks can form said covering surface to cover a geometrical body, such as a building or a part of a building. Said covering surface can function as roof or/and as façade.

One object according to an aspect of the invention is to provide a system for surface covering of geometrical bodies, such as buildings, with sun collecting capability. Said apparatuses together with special gauge blocks can cover most geometrical bodies. Said special gauge blocks have a similar appearance as the apparatuses but they have different suitable shapes to complete described covering surfaces and they have no light collecting capability.

One object according to an aspect of the invention is to provide an apparatus in which a plurality of optical elements, controlled by sensors and control circuits, will perform simultaneous identical angular movements in a simple way. This is done to optimally collect the solar radiation during the day.

One object according to an aspect of the invention is to provide an apparatus that concentrate solar radiation on to light converting elements for the purpose of generating energy such as electricity or heat.

One object according to an aspect of the invention is to provide an apparatus that uses light transporting elements, such as optical fibres, to concentrate light on light converting elements for the purpose of generating energy such as electricity or heat.

These objects among others are, according to a one aspect of the present invention, attained by an apparatus that will conduct identical angular movement of a number of mechanical elements. Two planes are connected to each other with a number of beams or pendulums; each beam or pendulum is connected to each plane with joints. The joints give free angular movement in two directions. The pendulums all have the same distance between the joints. When the planes are moved in relation to each other, in the ways possible, all the pendulums will move with an identical angular movement.

The joints can, in one embodiment, be ball-and-socket joints. A ball-and-socket joint can have a mechanically enclosed ball or it can have a ball kept in place by an external force. The external force can come from a spring or magnet. The force's size and direction on the ball is such that it together with other expected forces will give a force vector resultant, directed at the sockets centre, which is bigger than the force vector resultant created by the friction when the ball rotates. This will make the ball stay in the socket and not climb out of position.

To each beam is at least one condensing optical element fixed. To each beam is at least one light transporting or light converting element, such as an optical fibre or a photovoltaic element fixed. These elements are fixed so that when the beam is directed in the right way the solar radiation will focus on the light transporting or light-converting element.

These objects among others are, according to a one aspect of the present invention, attained by a light collecting device provided to collect and focus incident sunlight comprising at least a first focusing lens and at least a first light collector. A first and a second movable sheet are provided with a first substantially vertical distance from each other, the light collecting device further comprises at least a first pendulum provided to hold the first focusing lens in a first end, and wherein the pendulum is further provided to be coupled to the first sheet by a first joint and to the second sheet by a second joint, and the first and second joint provides movement in at least two substantially orthogonal directions.

By this arrangement the directions of the pendulums, and thereby the focusing lens, may be decided by displacing the first and second sheets in relation to each other. The sheets may for instance be of a plastic or metallic material, but any stiff material may be used.

According to one aspect of the invention the first and second joints are ball joints.

Ball joints, or ball-and-socket joints, provide movement in two substantially orthogonal angular directions. By connecting the pendulum by ball joints a larger angular action may be achieved as well as action in two directions. Thereby the pendulums may be directed not only in a straight line but rather in two orthogonal directions in a plane.

According to one variant of the invention each ball in the ball joints are provided on the pendulum with an offset from the centre line of said pendulum.

By providing the balls on the pendulums and mounting them to the side of the pendulum a greater angular action is achieved. If even greater angular action is required the balls may be provided on pillars in turn mounted on the pendulums to have an even greater offset from the centre line of the pendulum.

According to one aspect of the invention a spring is provided to bias the pendulum towards the first and second sheet to keep the pendulum in place in the ball joints.

By biasing the pendulum towards the two sheets, and thus biasing the balls provided at the pendulum towards the socket provided at each sheet, a more open socket may be used providing even greater angular action. By this arrangement there is no need to provide a snap-fit between the socket and the ball in the ball joint which may reduce the angular movement of the pendulum.

It should be made clear that the ball may equally well be provided at the sheets and consequently the sockets may be provided at the pendulum. However, this arrangement may not provide as great angular action as the arrangement with the socket provided in the sheet. This is a result of that no symmetric force application is achieved in the socket from the ball when the pendulum is tilted. The balls may thus more easily slip out of the socket for large angles.

It should also be made clear that the sockets provided in the sheet may not necessarily be separate entities, but may consist of a socket like recess in the sheet itself.

According to one aspect of the invention the first and second sheet each comprise at least a first edge and at least a second edge where the first and second edges are opposing each other. The first joint is provided at the first edge of the first sheet and the second joint is provided at the first edge of the second sheet. The light collecting means further comprising at least third and fourth joints and a second pendulum provided to hold a second focusing lens in a first end. The third joint is provided at the second edge of the first sheet and the fourth joint is provided at the second edge of the second sheet. The first pendulum is provided to be mounted to the first and second joints and the second pendulum is provided to be mounted to the third and fourth joints, and a spring is coupled between the first and second pendulum and provided to bias the first and second pendulums towards each other to thereby hold the first and second pendulums in position in the joints.

The above arrangement comprises two pendulums which are designed to connect to opposite edges provided at the respective sheets using joints and which pendulums are biased towards each other. In this arrangement the spring is connected to a pair of pendulums and thus moves with the pendulums when the sheets are displaced with relation to each other to position the pendulums. Therefore the spring does not perform any work when the sheets are moved. This is an advantage since less work is required to move the sheets to position the pendulums.

According to one aspect of the invention the light collector is provided on the pendulum substantially at the focal point of the focusing lens.

By providing the light collector on the pendulum and arranging the focusing lens to focus the light on the light collector, the light collector is always positioned at the focal point when the pendulum moves to thereby collect the maximum amount of sun light.

According to one aspect of the invention the light collector is selected from a group of light collectors comprising: a fibre, a photocell, a light-to-heat converter etc.

According to one aspect of the invention a displacer is provided to adjust the horizontal position of the first sheet in relation to the second sheet to thereby tilt the at least first pendulum to point in a specific direction.

Obviously the displacer may equally adjust the position of the second sheet. The displacer is suitably a motor, possibly an electric motor, but could also be an arrangement, comprising of so called memory alloys, which may take different positions depending on for instance heat or incident sunshine.

According to one aspect of the invention a light collecting device is provided to collect and focus incident sunlight and comprises a first sheet having a multitude of cut-outs, a second sheet provided at a vertical distance from the first sheet, having a multitude of cut-outs arranged corresponding to, and substantially in vertical relation to, the cut-outs in the first sheet, a multitude of pendulums provided in parallel to a normal to the sheets and arranged in corresponding cut-outs in the first and second sheet, a multitude of lenses and light collectors, wherein each pendulum comprises at least one lens provided to focus incident light onto a specific light collector, and a multitude of springs provided to bias the pendulums towards edges in the cut-outs of the first and second sheets.

According to the arrangement above several lenses are provided on corresponding pendulums and arranged together. This provides a suitable building block which may be used for collecting sunlight for possible transport into a building to light up areas which may for instance not have access to outdoor sunlight.

According to one aspect of the invention the multitude of springs are coupled between pairs of the pendulums and provided to bias the pair of pendulums against opposite edges of the cut-outs.

According to this aspect the spring does not perform any work when the sheets are moved. This is an advantage since less work is required to move the sheets to position the pendulums.

According to one aspect of the invention a multitude of ball joints are provided, coupling the multitude of pendulums to the first and second sheet, and wherein the multitude of springs are provided to bias the multitude of pendulums towards the ball joints to thereby keep the pendulums in position in the ball joints.

By providing ball joints and biasing the balls provided at the pendulum towards the socket provided at each sheets, a more open socket may be used providing even greater angular action. By this arrangement there is no need to provide a snap-fit between the socket and the ball in the ball joint which may reduce the angular movement of the pendulum. It should be made clear that the ball may equally well be provided at the sheets and the sockets at the pendulum.

According to one aspect of the invention a sun tracker is provided to control the displacer to adjust the position of the first and/or second sheet to point the focusing lenses, provided at the pendulums, substantially towards the position of the sun in the sky.

A sun tracker is a device provided to measure and/or calculate the position of the sun in the sky. It may include a light sensitive device capable of detecting the direction to the sun, or it may comprise a calendar capable of calculating the position of the sun based on position and time of day. To this effect the sun tracker may comprise a GPS (Global Positioning System) device for establishing the position as well as the time of day. Based on this information it is commonly known how to calculate the position of the sun. Devices for detecting the position of the sun are readily available on the market.

According to one aspect of the invention a method for collecting incident sun light is provided, comprising a first sheet and a second sheet displaced in vertical direction from each other, at least a first pendulum, provided with at least a first focusing lens at one end, and being coupled to the first and second sheet, wherein the focusing lens is arranged to focus incident sun light onto a light collector, comprising the steps of: —detecting and/or calculating the position of the sun in the sky, and —displacing the relative position of the first and second sheets to tilt the focusing lens substantially towards the detected and/or calculated position of the sun in the sky.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 10, which are given by way of illustration only, and thus are not limitative of the present invention.

FIGS. 8a and 8b are a schematic front view and a schematic side view of one aspect according to the present invention of the pendulum;

DETAILED DESCRIPTION OF DIFFERENT ASPECTS OF THE INVENTION

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
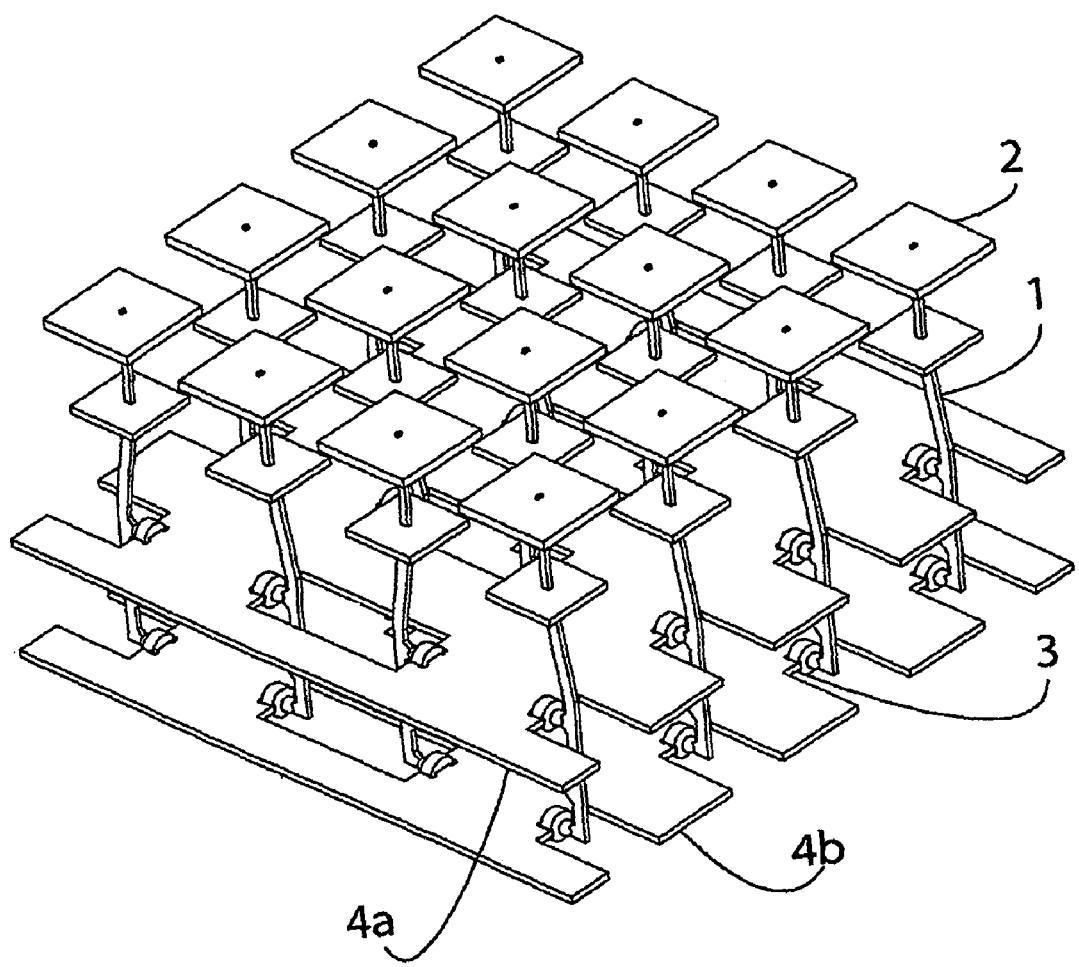
FIG. 1 shows one embodiment of the invention where 16 beams and 32 joints, which move freely in two angular directions, are used.

FIG. 1 is one embodiment of the invention where 16 beams, or pendulums 1, having condensing optical elements 2 attached to them. The embodiment also includes 32 joints 3, which move freely in two angular directions, and a first and second plane, or sheet, 4a and 4b, respectively.

Figure 2:
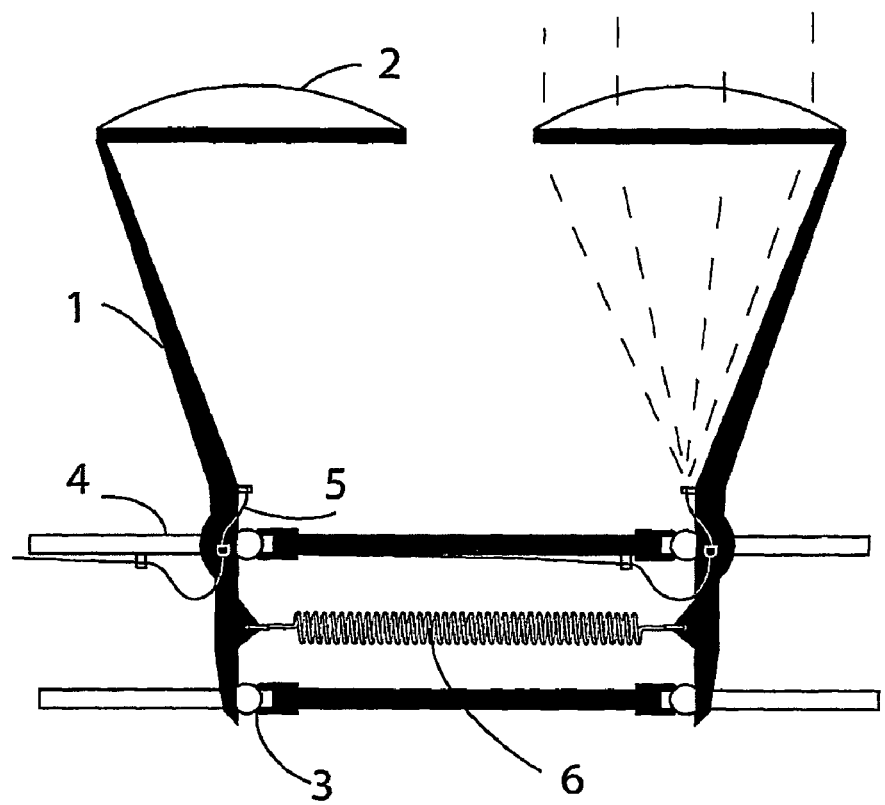
FIG. 2 shows schematically the principal of the present invention in a cross section.

FIG. 2 is a schematic cross sectional view of an embodiment showing the principal of the present invention. In the focal point of the condensing optical elements 2 are optical fibres 5 fixed. The beams 1 are directed in position by a spring 6 that will keep them in identical angular position and keep them from turning around the axis made between each beams two joints 3.

Figure 3:
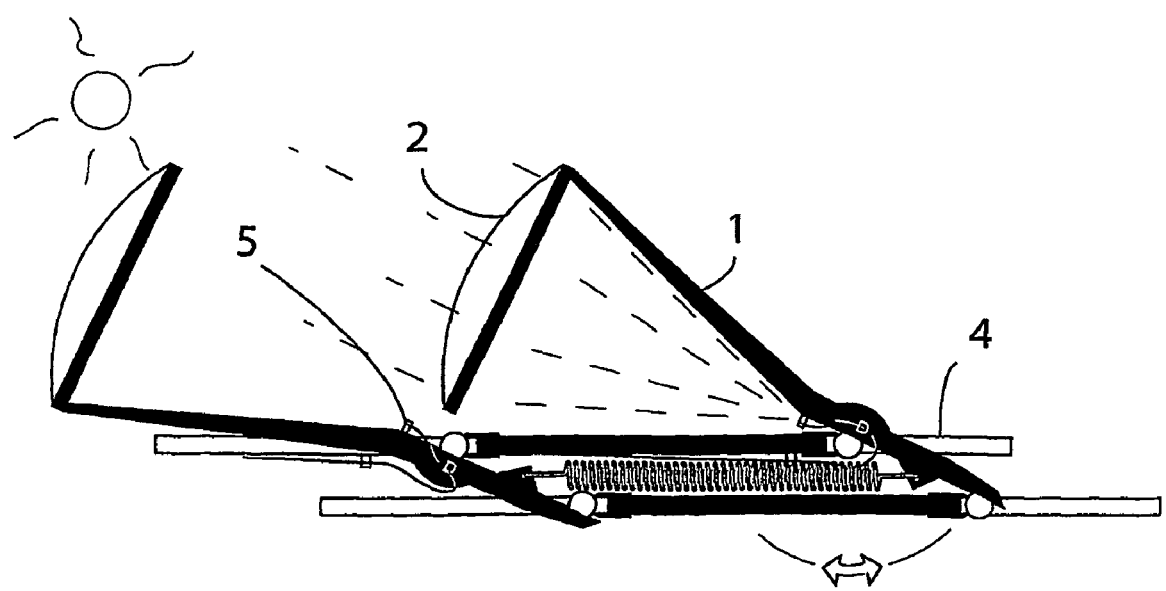
FIG. 3 shows schematically the principal of the present invention in a cross section, in which the beams and condensing optical elements have conducted an identical angular movement.

FIG. 3 is a schematic cross sectional view showing the principal of the present invention in which the beams 1 and the condensing optical elements 2 and the optical fibres 5 have conducted an identical angular movement. The planes, or sheets, 4 are moved in relation to each other. The movement of the sheets 4 caused the identical angular movement of the beams 1 and the condensing optical elements 2 and the optical fibres 5.

Figure 4:
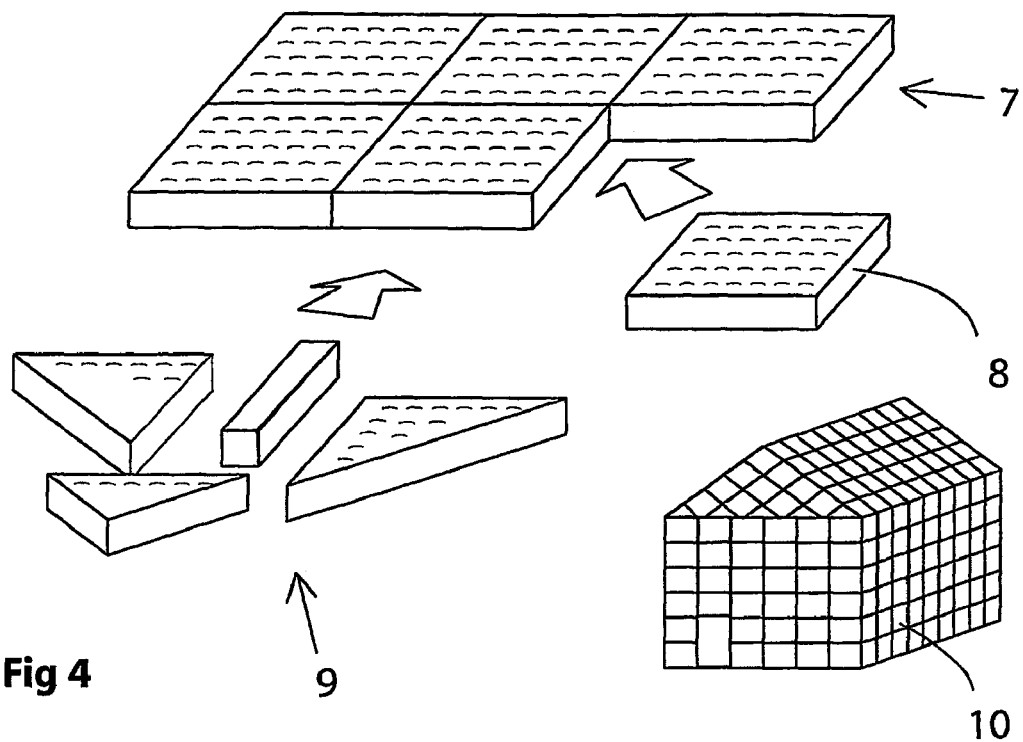
FIG. 4 shows one embodiment of the invention where a plurality of light collecting apparatuses is mounted together with special gauge blocks, which appear similar to the apparatuses but have no light collecting capability, to provide a covering surface of a geometrical body, such as a building. The covering surface can function as roof or/and as façade.

FIG. 4 is one embodiment according to one aspect of the invention where a plurality of light collecting apparatuses 8 is mounted together with special gauge blocks 9, which appear similar to the apparatuses but have no light collecting capability, to provide a covering surface 7 and 10 of a geometrical body, such as a building or a part of a building. The covering surface 7 and 10 can function as roof or/and as façade.

Figure 5:
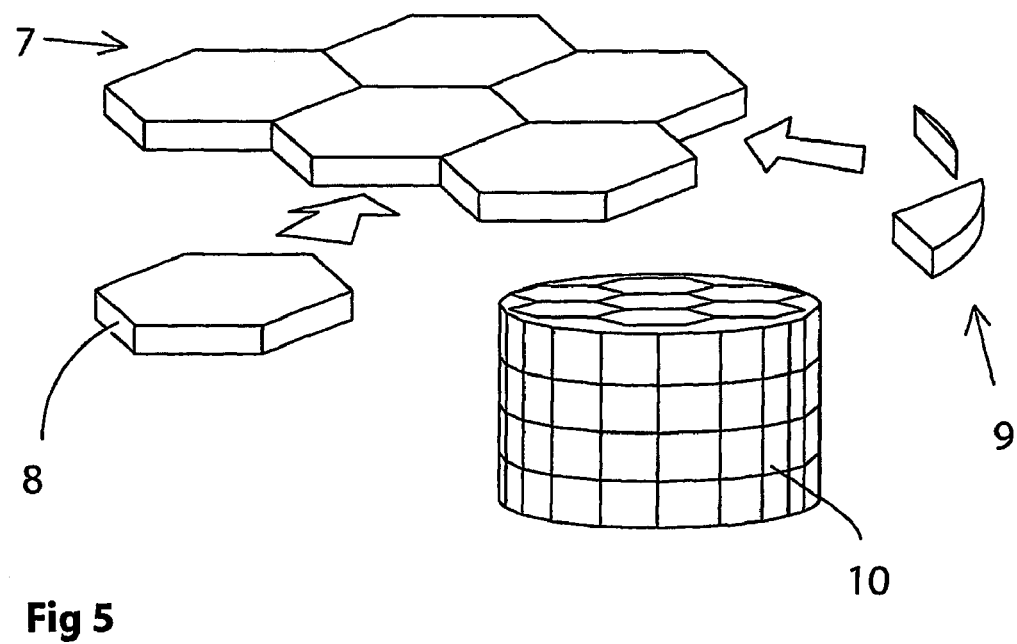
FIG. 5 shows one embodiment of the invention where a plurality of light collecting apparatuses is mounted together with special gauge blocks, which appear similar to the apparatuses but have no light collecting capability, to provide a covering surface of a geometrical body, such as a building. The covering surface can function as roof or/and as façade.

FIG. 5 is one embodiment according to one aspect of the invention where a plurality of light collecting apparatuses 8 is mounted together with special gauge blocks 9, which appear similar to the apparatuses but have no light collecting capability, to provide a covering surface 7 and 10 of a geometrical body, such as a building or a part of a building. The covering surface 7 and 10 can function as roof or/and as façade.

Figure 6:
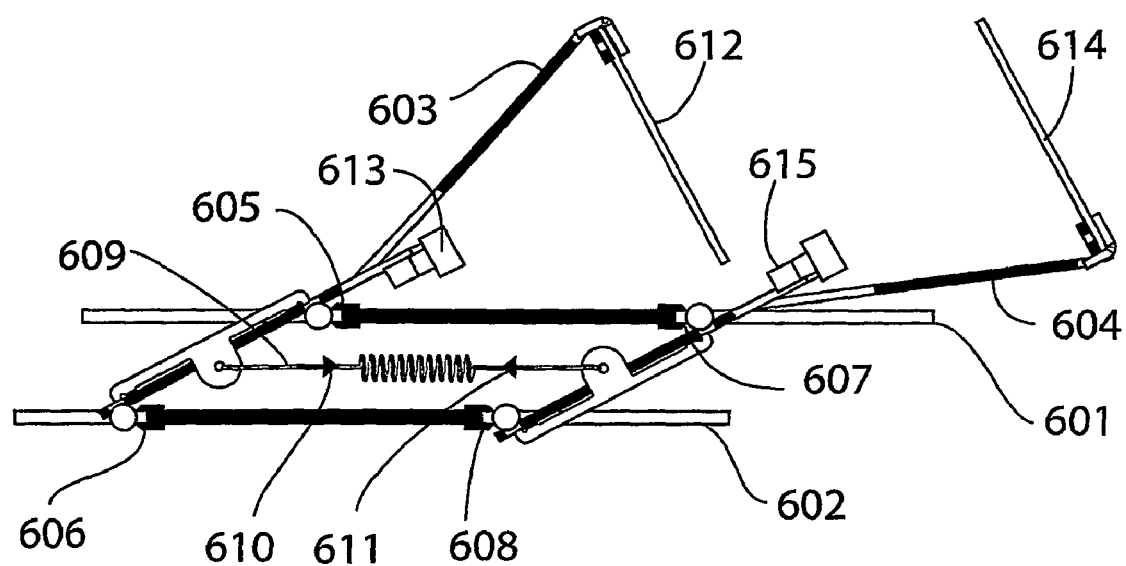
FIG. 6 is a schematic side view of one embodiment according to the invention disclosing two pendulums.

FIG. 6 is a schematic side view of an embodiment according to the present invention. A first sheet 601 is provided at a distance from a second sheet 602. The sheets 601 and 602 are kept in place in relation to each other by a first pendulum 603 and a second pendulum 604, which are connected to the first and second sheet 601 and 602 using first, second, third and fourth joints 605, 606, 607 and 608, respectively. The pendulums are positioned in corresponding cut-outs in the respective sheets and the first, second, third and fourth joints 605, 606, 607 and 608 are positioned at edges in respective cut-outs. A spring 609, connected between the first and second pendulums, bias the first pendulum 603 in the direction of the first and second joints 605 and 606, and the second pendulum 604 in the direction of the third and fourth joints 607 and 608 as is indicated by the arrows 610 and 611.

At a first end the first pendulum holds a first condensing lens 612 provided to focus incident light onto a light collecting device 613. The light collecting device 613 may for instance be a light conducting fibre, or may be connected to a light conducting fibre, or may be a light transforming device for instance for transforming incident light to heat or electricity. Similarly, the second pendulum 604 holds in a first end a second condensing lens 614 for focusing incident light onto a light collecting device 615.

In FIG. 6 the first sheet 601 and the second sheet 602 are displaced in relation to each other so that the cut-outs in the first sheet 601 are positioned offset to corresponding cut-outs in the second sheet 602, as is clearly shown in FIG. 6. The interaction between the joints and the pendulums will then tilt the pendulums to direct the condensing lenses in a specific direction, preferably towards the position of the sun in the sky. Thus, by adjusting the relative position of the first sheet 601, in relation to the second sheet 602, in two substantially orthogonal directions it is possible to direct the pendulums, and thereby the lenses towards the required position. The spring 609 may be a conventional spring. Alternatively, a rod of a suitable material such as metal or plastic may be provided to fix the pendulums in position. The rod may then, in one variant of the invention, be provided with a bend, or a knee, which will provide a spring action. This spring action will situate the balls in the sockets with appropriate force so that unnecessary wear does not occur, while at the same time firmly holding the balls in position. The spring force may be selected to be highly progressive so that the balls do not slip out of the sockets in the case of a sudden impact, for instance during transport or handling.

In general terms it could be stated that the spring provides a positive force forcing the balls into the respective socket to thereby hold the respective pendulum in position.

According to one variant of a particular embodiment of the invention, the force holding the balls in the respective sockets is not provided by a spring but may rather be a magnetic force, provided by magnets. Any other means providing such a positive force could equally well be used.

One particular advantage with using magnets is that the pendulums would be very easy to manufacture since the balls would be drawn to the respective socket by the magnetic force.

Figure 7:
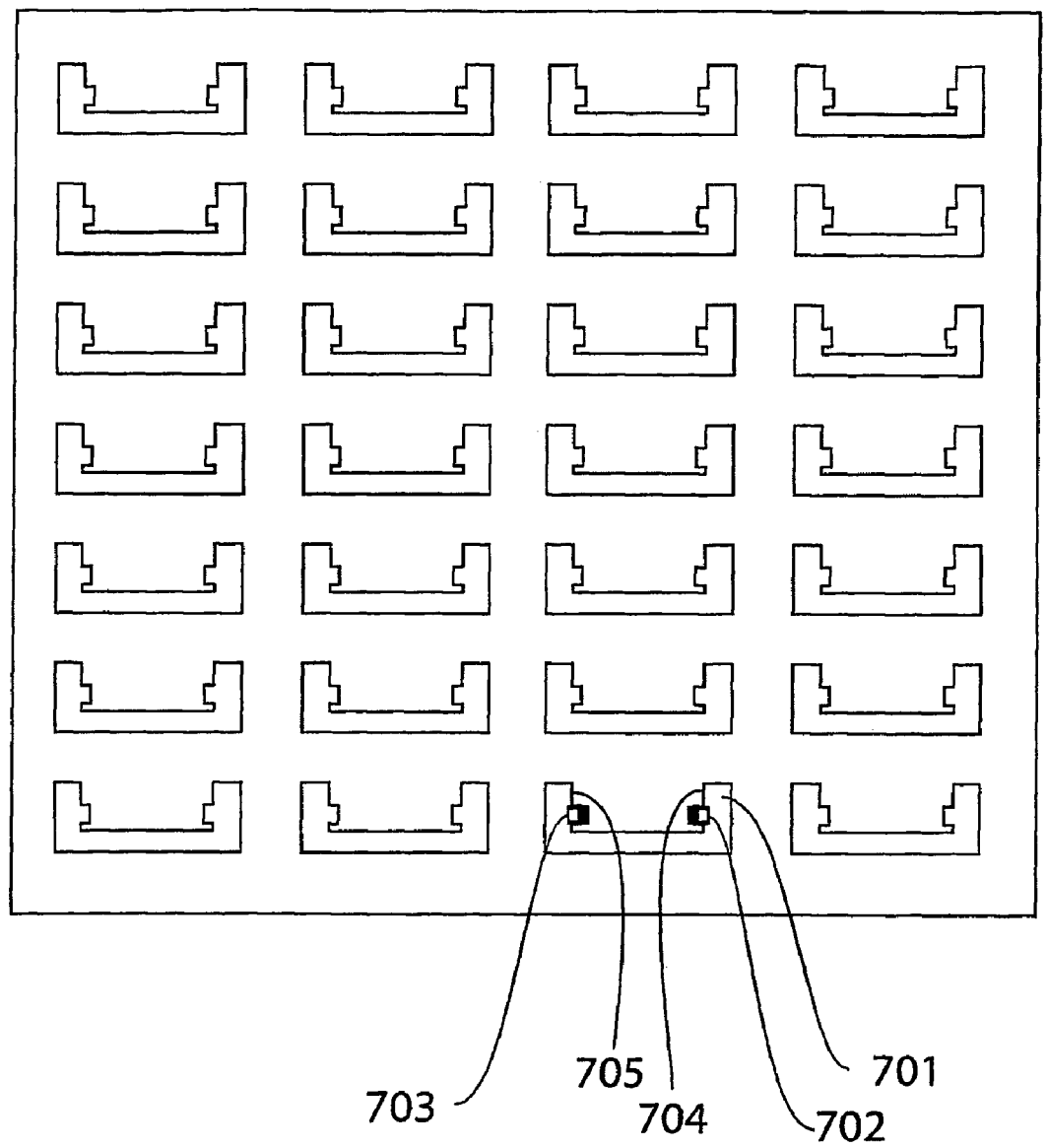
FIG. 7 is a schematic top view of one aspect of the present invention disclosing a sheet.

FIG. 7 is a schematic top view of a sheet according to one embodiment of the present invention. In this embodiment 28 cut-outs are provided in each sheet, of which one is denoted 701. In each cut-out two sockets 702 and 703 in a ball-and-socket joint are provided on opposite edges 704 and 705. The sockets are provided to receive corresponding balls on two pendulums to be inserted into the cut-out 701 to thereby construe a ball-and-socket joint as previously disclosed. Obviously, the sockets could as easily be provided on the pendulums and the balls on the corresponding edges. It should also be made clear that, even though in the present embodiment two pendulums are arranged in a common cut-out, which is skillfully designed to provided the needed opposite edges, each pendulum could as well be arranged in an "own", dedicated cut-out.

FIGS. 8a and 8b are a schematic front view and a schematic side view, respectively of the pendulum according to one aspect of the invention. In FIG. 8b balls 801 and 802 are provided on the pendulum to make part of a ball-and-socket joint for connecting the pendulum to the first and second sheet disclosed in FIG. 6. In a first end 803 a connector is provided for connecting a focusing lens to the pendulum and at the focal point of the lens a light collecting device 804 is provided. A spring connector for connecting a spring to the pendulum is denoted 805.

According to one variant of the invention the spring connector may be connected using a somewhat stiff rod. The spring connector 805 may then be provided with a spring action to provide a positive force forcing the balls towards the sockets. The spring connector 805 may have a rather short spring action distance, before it interacts with the pendulum so that, while providing the spring action to hold the balls in the sockets, the balls are not allowed to leap out of the sockets in case of sudden impact, for instance during transport or handling.

Figure 9:
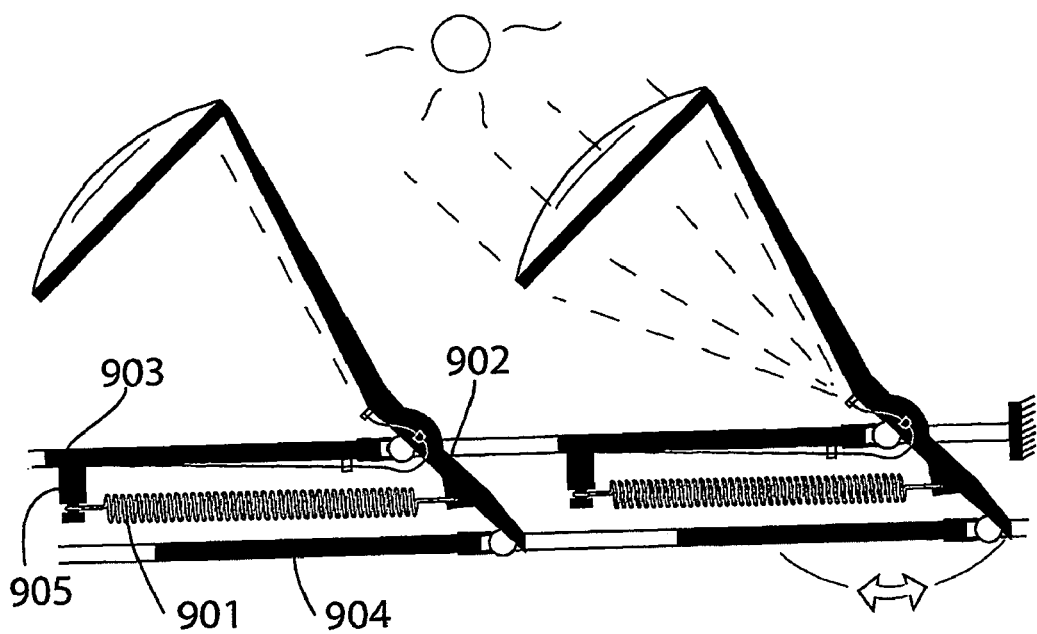
FIG. 9 is a schematic side view of one aspect of the present invention.

FIG. 9 is a schematic side view of one aspect according to the present invention. In this embodiment the pendulums are not biased in pairs. Instead a spring 901 is connected between a pendulum 902 and connection point 905 on, in this embodiment, a first sheet 903. When a second sheet 904 is displaced in relation to the first sheet 903 the pendulums perform the same tilting function as in the previous embodiments, without the need for placing the pendulums in pairs. This embodiment, however, lacks the elegance of the previous embodiments since the spring 901 performs work when the second sheet 904 is displaced, which may require significant forces if many pendulums should be moved.

Figure 10:
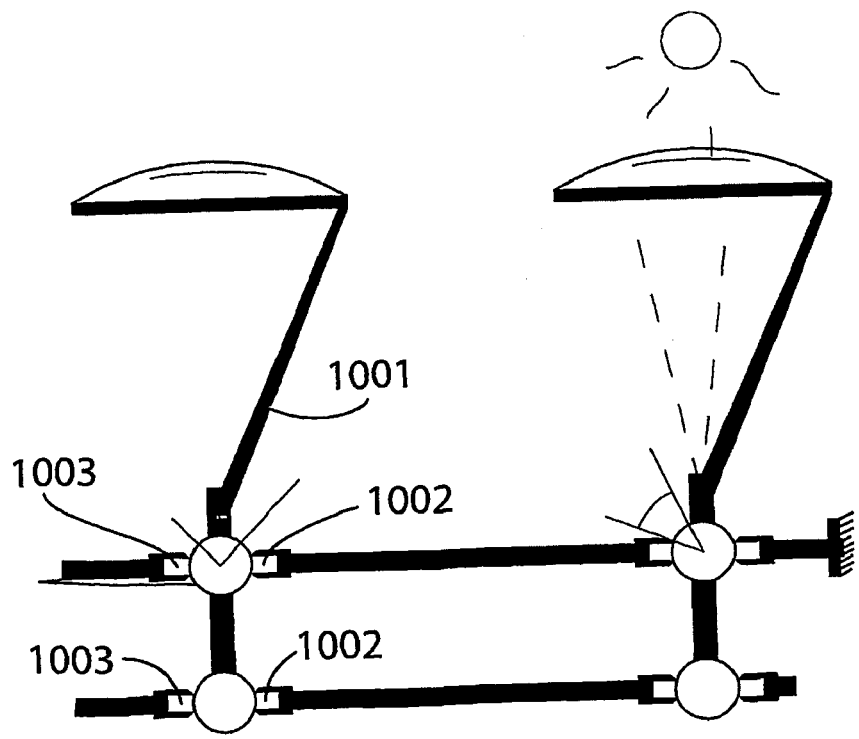
FIG. 10 is a schematic side view of yet a further aspect of the present invention.

FIG. 10 is a schematic side view of one aspect of the present invention. In this embodiment no spring is provided, but the pendulum 1001 is rather hold in position by opposing sockets 1002 and 1003. This embodiment has the draw back that the angular movement of the pendulum is reduced compared to the earlier embodiments.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. Light collecting device provided to collect and focus incident sunlight comprising at least a first focusing lens and at least a first light collector, characterised in
    a first and a second movable sheet provided with a first substantially vertical distance from each other in a first position,
    said light collecting device further comprises at least a first pendulum provided to hold said first focusing lens in a first end, and wherein
    said pendulum is further provided to be coupled to said first sheet by a first joint and to said second sheet by a second joint, and said first and second joint provides movement in at least two substantially orthogonal directions.

2. The light collecting device according to claim 1, wherein said first and second joints are ball joints.

3. The light collecting device according to claim 2, wherein a spring is provided to bias said pendulum towards said first and second sheet to keep said pendulum in place in said ball joints.

4. The light collecting device according to claim 1, wherein
    said each ball in said ball joints are provided on said pendulum with an offset from the center line of said pendulum.

5. The light collecting means according to claim 1, wherein
    said first sheet comprises at least a first edge and at least a second edge where said first and second edges are opposing each other,
    said second sheet comprises at least a first edge and at least a second edge where said first and second edges are opposing each other and are located in substantially vertical relation to said first and second edge of said first sheet when said first and second sheet are in said first position,
    said first joint is provided at said first edge of said first sheet,
    said second joint is provided at said first edge of said second sheet,
    said light collecting means further comprising at least third and fourth joints and a second pendulum provided to hold a second focusing lens in a first end,
    said third joint is provided at said second edge of said first sheet, said fourth joint is provided at said second edge of said second sheet, said first pendulum is provided to be mounted to said first and second joints and said second pendulum is provided to be mounted to said third and fourth joints, and a spring coupled between said first and second pendulum and provided to bias said first and second pendulums towards each other to thereby hold said first and second pendulums in position in said joints.

6. The light collecting device according to claim 1, wherein said light collector is provided on said pendulum substantially at the focal point of said focusing lens.

7. The light collecting device according to claim 6, wherein said light collector is selected from a group of light collectors comprising: a fiber, a photocell, or a light-to-heat converter.

8. The light collecting device according to claim 1, comprising a displacer provided to adjust the horizontal position of said first sheet in relation to said second sheet to thereby tilt said at least first pendulum to point in a specific vertical direction.

9. A light collecting device provided to collect and focus incident sunlight, comprising a first sheet having a multitude of cut-outs, a second sheet provided at a vertical distance from said first sheet, having a multitude of cut-outs arranged corresponding, and substantially in vertical relation, to said cut-outs in said first sheet, a multitude of pendulums provided in parallel to a normal to each of said sheets and arranged in corresponding cut-outs in said first and second sheet, a multitude of lenses and light collectors, wherein each pendulum comprises at least one lens provided to focus incident light onto a specific light collector, and a multitude of springs provided to bias said pendulums towards edges in said cut-outs of said first and second sheets.

10. The light collecting device according to claim 9, wherein said multitude of springs are coupled between pairs of said pendulums and provided to bias said pair of pendulums against opposite edges of said cut-outs.

11. The light collecting device according to claim 10, comprising a multitude of ball joints coupling said multitude of pendulums to said first and second sheet, and wherein said multitude of springs are provided to bias said multitude of pendulums towards said ball joints to thereby keep said pendulums in position in said ball joints.

12. The light collecting device according to claim 11, wherein each ball in said multitude of ball joints are provided on respective pendulums with an offset from the center line of said pendulum.

13. The light collecting device according to claim 9, comprising a displacer provided to adjust the horizontal position of said first or second sheet in relation to said second or first sheet to thereby tilt said pendulums in a specific direction.

14. The light collecting device according to claim 9, comprising a sun tracker provided to control said displacer to adjust the position of said first and/or second sheet to point said focusing lenses, provided at said pendulums, substantially towards the position of the sun in the sky.

15. A method for collecting incident sun light comprising a first sheet and a second sheet displaced in vertical direction from each other, at least a first pendulum, provided with at least a first focusing lens at one end, and being coupled to said first and second sheet, wherein said focusing lens is arranged to focus incident sun light onto a light collector, comprising the steps of:

detecting and/or calculating the position of the sun in the sky, and displacing the relative position of said first and second sheets to tilt said focusing lens substantially towards said detected and/or calculated position of the sun in the sky.

* * * * *